(12) United States Patent
Sridhar et al.

(10) Patent No.: US 9,397,804 B2
(45) Date of Patent: Jul. 19, 2016

(54) APPARATUS AND METHOD FOR SUPPORTING IDLE MODE LOAD BALANCING

(75) Inventors: Kamakshi Sridhar, Plano, TX (US); Jim Seymour, North Aurora, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 275 days.

(21) Appl. No.: 13/517,765

(22) Filed: Jun. 14, 2012

(65) Prior Publication Data

US 2013/0336110 A1    Dec. 19, 2013

(51) Int. Cl.
*G01R 31/08* (2006.01)
*H04L 5/00* (2006.01)
*H04W 28/08* (2009.01)

(52) U.S. Cl.
CPC ............ *H04L 5/0044* (2013.01); *H04L 5/0071* (2013.01); *H04L 5/0089* (2013.01); *H04W 28/08* (2013.01)

(58) Field of Classification Search
USPC .............. 370/230, 230.1, 235, 252, 328, 338, 370/401
See application file for complete search history.

(56) References Cited

U.S. PATENT DOCUMENTS

| | | | |
|---|---|---|---|
| 6,987,749 B2 * | 1/2006 | Cai et al. ........................ | 370/335 |
| 8,045,527 B2 * | 10/2011 | Fan et al. ....................... | 370/332 |
| 8,331,921 B2 * | 12/2012 | Britt et al. ....................... | 455/418 |
| 8,374,622 B2 * | 2/2013 | Trudeau .......................... | 455/453 |
| 2010/0015926 A1 * | 1/2010 | Luff ............................ | 455/67.13 |
| 2010/0135170 A1 | 6/2010 | Fan et al. | |
| 2011/0009154 A1 * | 1/2011 | Ishii ............................... | 455/522 |
| 2011/0176424 A1 * | 7/2011 | Yang et al. .................... | 370/236.2 |
| 2012/0044870 A1 * | 2/2012 | Mochizuki et al. ............ | 370/328 |
| 2012/0225682 A1 * | 9/2012 | Kojima .......................... | 455/507 |
| 2013/0210447 A1 * | 8/2013 | Moe et al. ....................... | 455/453 |

FOREIGN PATENT DOCUMENTS

| WO | WO 2011/067862 A1 | 9/2011 |
|---|---|---|
| WO | WO 2012/059954 A1 | 10/2012 |

OTHER PUBLICATIONS

International Search Report and Written Opinion for International Patent Application Serial No. PCT/US2013/045165, mailed Dec. 17, 2013, consists of 14 unnumbered pages.

(Continued)

*Primary Examiner* — Ricky Ngo
*Assistant Examiner* — Christine Ng
(74) *Attorney, Agent, or Firm* — Tong, Rea, Bentley & Kim, LLC

(57) ABSTRACT

An idle mode load balancing capability enables balancing of idle mode wireless devices across wireless carriers in order to ensure that the possibility of congestion on any given wireless carrier is reduced or even minimized when idle mode wireless devices become active. The idle mode load balancing may be performed for wireless carriers by determining relative numbers of idle mode wireless devices on the wireless carriers and performing idle mode load balancing for the wireless carriers based on the relative numbers of idle mode wireless devices on the wireless carriers. The relative number of idle mode wireless devices on a wireless carrier may be determined based on a change in load on the wireless carrier during the observation period, which may be determined based on an observed change in load on the wireless carrier and a load correction associated with session terminations on the wireless carrier.

22 Claims, 4 Drawing Sheets

(56) References Cited

OTHER PUBLICATIONS

Huawei, "Idle Mode Inter RAT Load Balancing," 3GPP TSG RAN WG3 Meeting #59, Mar. 31-Apr. 3, 2008, vol. RAN WG3, 3GPP, Shenzhen, China, XP050163964, consists of 5 unnumbered pages.

Huawei, "Idle Mode Counting for Camp Load Balancing," 3GPP TSG RAN WG2 #60, Nov. 5-9, 2007, vol. RAN WG2, 3GPP, Jeju, Korea, XP050137309, consists of 5 unnumbered pages.

3$^{rd}$ Generation Partnership Project, "3rd Generation Partnership Project; Technical Specification Group Radio Access Network; Evolved Universal Terrestrial Radio Access Network (E-UTRAN); Self-Configuring and Self-Optimizing Network (SON) Use Cases and Solutions," 3GPP Standard, 3GPP TR 36.902, V9.3.1, Mar. 2011, pp. 1-21, XP050477264.

Kordyback, K., et al., "Self Organizing Networks (SON)," *LTE for UMTS: Evolution to LTE-Advanced*, Mar. 4, 2011, pp. 237-255, Second Edition, John Wiley & Sons, Ltd., XP055091506.

Laselva, D., et al., "Self-Optimisation," *LTE Self-Organising Networks (SON): Network Management Automation for Operational Efficiency*, Dec. 9, 2011, pp. 135-234, First Edition, John Wiley & Sons, Ltd., XP055091508.

\* cited by examiner

APPARATUS AND METHOD FOR SUPPORTING IDLE MODE LOAD BALANCING

TECHNICAL FIELD

The invention relates generally to wireless communication networks and, more specifically but not exclusively, to idle mode load balancing in wireless communication networks.

BACKGROUND

In many wireless systems, a wireless device may transition between various states, including an idle mode state in which the wireless device is idle within the wireless access network. In Wideband Code Division Multiple Access (WCDMA) systems, for example, a User Equipment (UE) may be in an idle mode state referred to as the Radio Resource Control Idle (RRC_IDLE) state. Similarly, in a Long Term Evolution (LTE) system, a UE may be in an idle mode state referred to as the LTE-Idle state. When a UE is in the idle mode state, the Radio Access Network (RAN) is unaware of the presence of the UE, because no Radio Access Bearer (RAB) exists. However, when a UE is in the idle mode state, the UE is still contribute to the signaling load in the core network (e.g., due to location updates as the UE moves) or paging load. Additionally, an increase in the active load on the wireless system may result when idle mode UEs become active, which may in turn result in sudden network congestion.

SUMMARY

Various deficiencies in the prior art are addressed by embodiments for determining a number of idle mode wireless devices associated with a wireless carrier.

In one embodiment, an apparatus includes a processor and a memory communicatively connected to the processor, where the processor is configured to determine a number of idle mode wireless devices associated with a wireless carrier based on a change in load on the wireless carrier during an observation period.

In one embodiment, a computer-readable storage medium stores instructions which, when executed by a computer, cause the computer to perform a method including a step of determining a number of idle mode wireless devices associated with a wireless carrier based on a change in load on the wireless carrier during an observation period.

In one embodiment, a method is provided which includes a step of determining, using at least one processor, a number of idle mode wireless devices associated with a wireless carrier based on a change in load on the wireless carrier during an observation period.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

In general, an idle mode load balancing capability is depicted and described herein, although various other capabilities also may be presented herein.

In general, idle mode load balancing enables balancing of idle mode wireless devices across wireless carriers. This may ensure that the possibility of congestion on any given wireless carrier is reduced (or, in at least some cases, even minimized) when the idle mode wireless devices become active.

In at least some embodiments, in order to perform idle mode load balancing for a given set of wireless carriers, relative load levels on the wireless carriers are determined, relative numbers of idle mode wireless devices on the respective wireless carriers are inferred based on the relative load levels on the wireless carriers, and idle mode load balancing is performed based on the relative numbers of idle mode wireless devices on the respective wireless carriers.

In at least some embodiments, in order to perform idle mode load balancing for a given set of wireless carriers, information indicative of the relative numbers of idle mode wireless devices on the respective wireless carriers in the set of wireless carriers is determined and idle mode load balancing is performed based on the relative numbers of idle mode wireless devices on the respective wireless carriers. The idle mode load balancing capability includes embodiments for determining information indicative of the relative numbers of idle mode wireless devices on wireless carriers in a set of wireless carriers for use in performing idle mode load balancing for the set of wireless carriers.

In at least some embodiments, for a given set of wireless carriers, the idle mode load balancing capability obviates the need to determine the absolute numbers of idle mode wireless devices on the wireless carriers since idle mode load balancing can be invoked for one or more of the wireless carriers when there is a disproportionate number of idle mode wireless devices on one or more of the wireless carriers relative to the other wireless carrier(s) of the set of wireless carriers.

Although primarily depicted and described with respect to use of the idle mode load balancing capability within a Wideband Code Division Multiple Access (WCDMA) system, it is noted that the idle mode load balancing capability may be utilized within various other types of wireless systems in which an idle mode state (or similar state) is supported for the wireless user devices (e.g., other types of Third Generation (3G) wireless systems, Fourth Generation (4G) wireless systems (e.g., Long Term Evolution (LTE)), or the like, as well as various combinations thereof).

Figure 1:
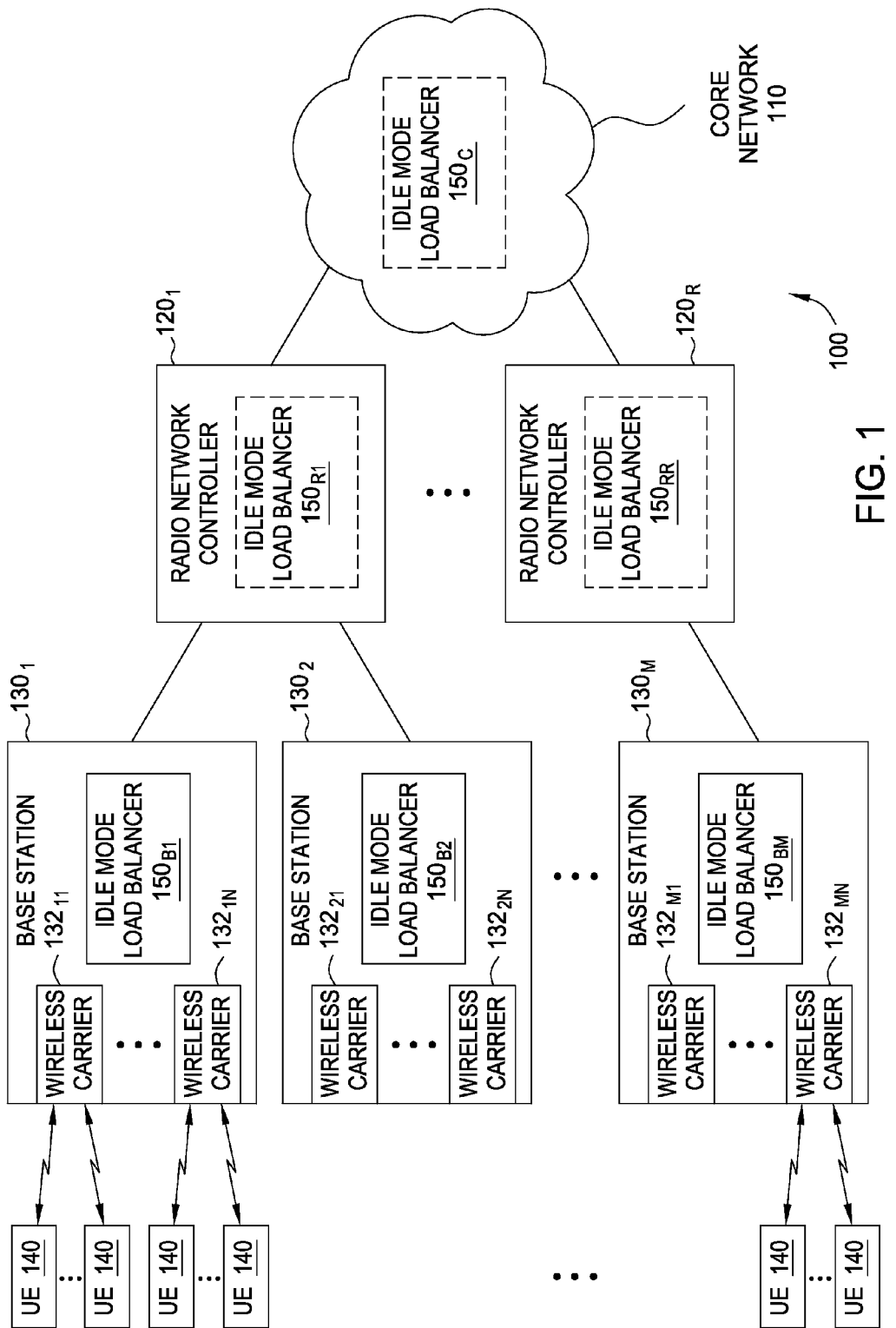
FIG. 1 depicts a high-level block diagram of an exemplary wireless system.

FIG. 1 depicts a high-level block diagram of an exemplary wireless system.

The wireless system 100 includes a core network 110, a plurality of Radio Network Controllers (RNCs) 120, a plurality of Base Stations (BSs) 130, a plurality of User Equipments (UEs) 140, and a plurality of Idle Mode Load Balancers (IMLBs) 150.

The core network 110 supports the RNCs 120, facilitating communication from RNCs 120 and to RNCs 120. As depicted in FIG. 1, the plurality of RNCs 120 includes RNCs $120_1$-$120_R$, each of which is communicatively connected to the core network 110.

The RNCs $120_1$-$120_R$ each support one or more of the BSs 130 (although it will be appreciated that an RNC typically supports multiple BSs). As depicted in FIG. 1, RNC $120_1$ supports BSs $130_1$ and $130_2$, each of which is communicatively connected to RNC $120_1$. As further depicted in FIG. 1, RNC $120_R$ supports BS $130_M$, which is communicatively connected to RNC $120_R$. The connections of the remaining BSs 130 to the RNCs 120 are omitted for purposes of clarity.

The BSs $130_1$-$130_M$ each support a plurality of wireless carriers $132_1$-$132_N$ (collectively, wireless carriers 132), where each wireless carrier 132 is capable of supporting a plurality of UEs 140, respectively. For example, BS $130_1$ includes a plurality of wireless carriers $132_1$-$132_N$, each of which supports a plurality of UEs 140, respectively. The other BSs $130_2$-$130_M$ are similarly configured (although it will be appreciated that the numbers of wireless carriers 132 supported by BSs 130 may vary across the respective BSs 130). The boxes labeled "wireless carrier 132" in FIG. 1 may represent the capability of the respective BSs 130 to support the wireless carriers 132. The use of the wireless carriers 132 to support sessions of the UEs 140 will be understood by one skilled in the art. A wireless carrier 132 is understood to have a load associated therewith which changes over time as new sessions are originated and existing sessions are terminated. The load on a wireless carrier 132 is understood to be equal to or indicative of a number of active sessions on the wireless carrier 132 (i.e., use of the term "load" herein when referring to a wireless carrier 132, unless otherwise indicated, refers to the number of active sessions on the wireless carrier 132 or information indicative of the number of active sessions on the wireless carrier 132).

The UEs 140 each are configured to access at least one of the BSs 130 wirelessly via at least one of the wireless carriers 132 of the at least one of the BSs 130. The UEs 140 may include any suitable types of wireless user devices (e.g., laptop computers, tablet computers, smart phones, cellular phones, and the like). The UEs 140 are configured to operate in various states, including, among others, idle mode state. In general, a UE 140 may enter an idle mode state in which the UE 140 is not active on the RAN (and, indeed, the RAN is unaware of its presence) and one or more active states in which the UE 140 is active on the RAN. For example, when system 100 is a WCDMA system, the UEs 140 are configured to enter the Radio Resource Control Idle (RRC_IDLE) state standardized in WCDMA systems. It is noted that, while the RAN is unaware of the presence of a UE 140 when the UE 140 is in idle mode state, the UE 140 still contributes to load on the system 100, such as via signaling load in the core network 110 (e.g., due to location updates as the UE 140 moves around) or paging load. Additionally, it is noted that a UE 140 in the idle mode state also may contribute to the active load on the system 100 when the UE 140 becomes active. It is noted that a UE 140 that is in the idle mode state is referred to herein as an idle mode UE 140.

The system 100 is configured to perform idle mode load balancing for balancing idle mode UEs 140 across wireless carriers 132 of BSs 130. As depicted in FIG. 1, idle mode load balancing within the system 100 may be performed at any suitable granularity using the IMLBs 150. For example, the system 100 may be configured to perform idle mode load balancing for balancing idle mode UEs 140 across any suitable combinations of wireless carriers $132_{11}$-$132_{MN}$ of BSs $130_1$-$130_M$.

In one embodiment, the BSs $130_1$-$130_M$ include a respective plurality of IMLBs $150_{B1}$-$150_{BM}$ (collectively, IMLBs $150_B$) where an IMLB $150_B$ of a BS 130 is configured to perform idle mode load balancing for some or all of the wireless carriers 132 supported by the BS 130.

In one embodiment, the RNCs $120_1$-$120_R$ include a respective plurality of IMLBs $150_{R1}$-$150_{RR}$ (collectively, IMLBs $150_R$), where an IMLB $150_R$ of an RNC 120 is configured to perform idle mode load balancing for any of the wireless carriers 132 of any of the BSs 130 supported by the RNC 120 (e.g., for a group of wireless carriers 132 within a BS 130, for a group of wireless carriers 132 of multiple BSs 130, or the like, as well as various combinations thereof).

In one embodiment, core network 110 includes an IMLB $150_C$, which is configured to perform idle mode load balancing for any of the wireless carriers 132 of any of the BSs 130 served by core network 110 (e.g., for a group of wireless carriers 132 within a BS 130, for a group of wireless carriers 132 across BSs 130 of a single RNC 120, for a group of wireless carriers 132 across BSs 130 of multiple RNCs 120, or the like, as well as various combinations thereof). In one embodiment, IMLBs 150 may be configured to support idle mode load balancing across carriers associated with different radio access technologies (RATs).

The IMLBs $150_B$, $150_R$, and $150_C$ may be referred to collectively herein as IMLBs 150.

It is noted that various combinations of such embodiments (e.g., using any suitable number of IMLBs 150 deployed at any suitable level(s) of the communication hierarchy) may be used to support idle mode load balancing at any suitable granularity.

The IMLBs 150 each are configured to perform idle mode load balancing for a set of wireless carriers 132 supporting UEs 140 in order to balance idle mode UEs 140 across the wireless carriers 132. In one embodiment, an IMLB 150 is configured to perform idle mode load balancing for a set of wireless carriers 132 by determining relative numbers of idle mode UEs 140 of the wireless carriers 132 and performing idle mode load balancing for the set of wireless carriers 132 based on the relative numbers of idle mode UEs 140 of the wireless carriers 132.

In one embodiment, an IMLB 150 is configured to determine relative numbers of idle mode UEs 140 of the wireless carriers 132 for which idle mode load balancing is to be performed based on changes in load on the wireless carriers 132 during the observation period. It is noted that the change in load on a wireless carrier 132 may be an increase in load on the wireless carrier 132 or a decrease in load on the wireless carrier 132. In one embodiment, for a given set of the wireless carriers 132, the relative numbers of idle mode UEs 140 on the wireless carriers 132 may be inferred from rates of change of load on the respective wireless carriers 132 during an observation period, where the rates of change of load on the respective wireless carriers 132 may be determined based on changes in the loads on the respective wireless carriers 132 during the observation period.

The rate of change of load on a wireless carrier 132 during an observation period may be indicative of a number of session originations on the wireless carrier 132 during the observation period. The number of session originations on a wireless carrier 132 during an observation period may be indicative of (e.g., proportional to) the number of idle mode UEs 140 on the wireless carrier 132 (e.g., the higher the number of session originations on the wireless carrier 132 during the observation period, the higher the likelihood of a higher number of idle mode UEs 140 on the wireless carrier 132 during the observation period). Thus, the number of session originations on a wireless carrier 132 during an observation period is indicative of the rate of change of load on the wireless carrier 132 during the observation period and, similarly, the number of idle mode UEs on the wireless carrier 132 during the observation period may be estimated based on the rate of change of load on the wireless carrier 132 during the observation period.

The rate of change of load on a wireless carrier 132 during an observation period, however, while proportional to the number of session originations on the wireless carrier 132 during the observation period, is not necessarily equal to the number of session originations on the wireless carrier 132 during the observation period. This is due to the fact that some of the sessions may have terminated during the observation period. As a result, the rate of change of load on a wireless carrier 132 during an observation period may be greater than the number of session originations on the wireless carrier 132 during the observation period where there is at least one session termination on the wireless carrier 132 during the observation period. In this case, the rate of change of load on the wireless carrier 132 during the observation period is increased by an amount corresponding to the estimated decrease in the rate of change of load on the wireless carrier 132 due to session terminations during the observation period that subtract from the rate of change of load on the wireless carrier 132 during the observation period. In other words, the load on the wireless carrier 132 that is contributed by session terminations on the wireless carrier 132 is added back into the observed load on the wireless carrier 132 in order to counteract any reduction of the observed load on the wireless carrier 132 due to the session terminations (i.e., the observed load on the wireless carrier 132 is increased by an amount that corresponds to an amount of load increase that would have been observed on the wireless carrier 132 had there been no session terminations during the observation period, because those terminated sessions would have contributed to the load increase on the wireless carrier 132). In one embodiment, the number of session terminations on a wireless carrier 132 is assumed to be a fixed fraction of the total active load on the wireless carrier 132 and, therefore, since the active load on the wireless carrier 132 can be determined, the number of session terminations can be computed.

In one embodiment, for a given set of the wireless carriers 132, idle mode load balancing is invoked for a given wireless carrier 132 when the loading level and the rate of change of load on the wireless carrier 132 are relatively high as compared with the other wireless carrier(s) 132 in the set of wireless carriers 132.

Figure 2:
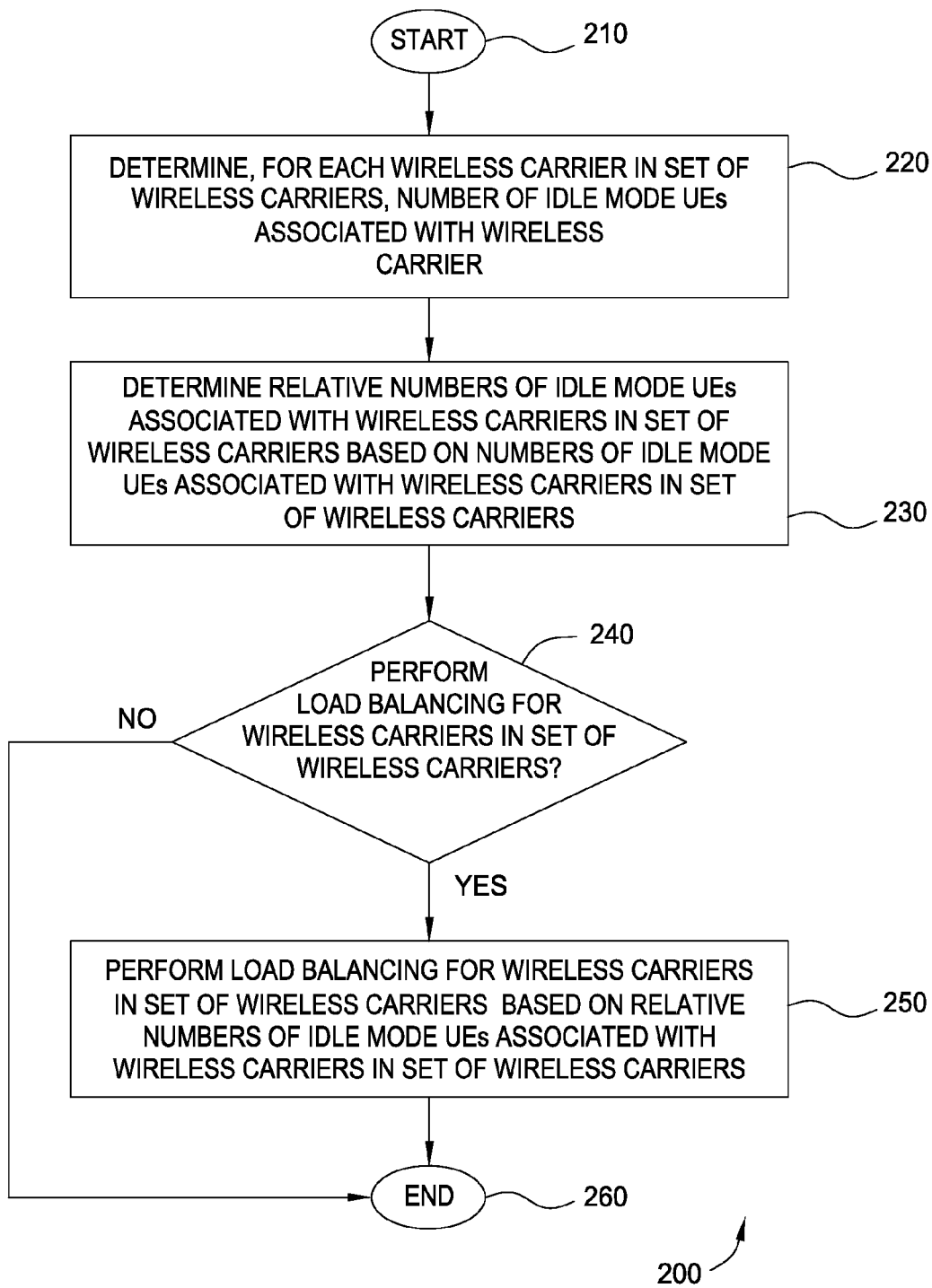
FIG. 2 depicts one embodiment of a method for performing idle mode load balancing for a set of wireless carriers.
Figure 3:
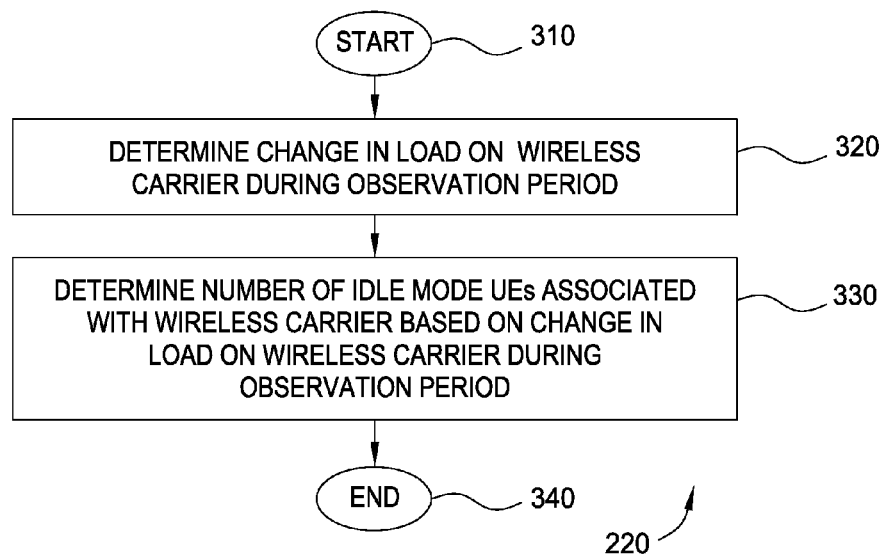
FIG. 3 depicts one embodiment of a method for determining a number of idle mode UEs associated with a wireless carrier.
Figure 4:
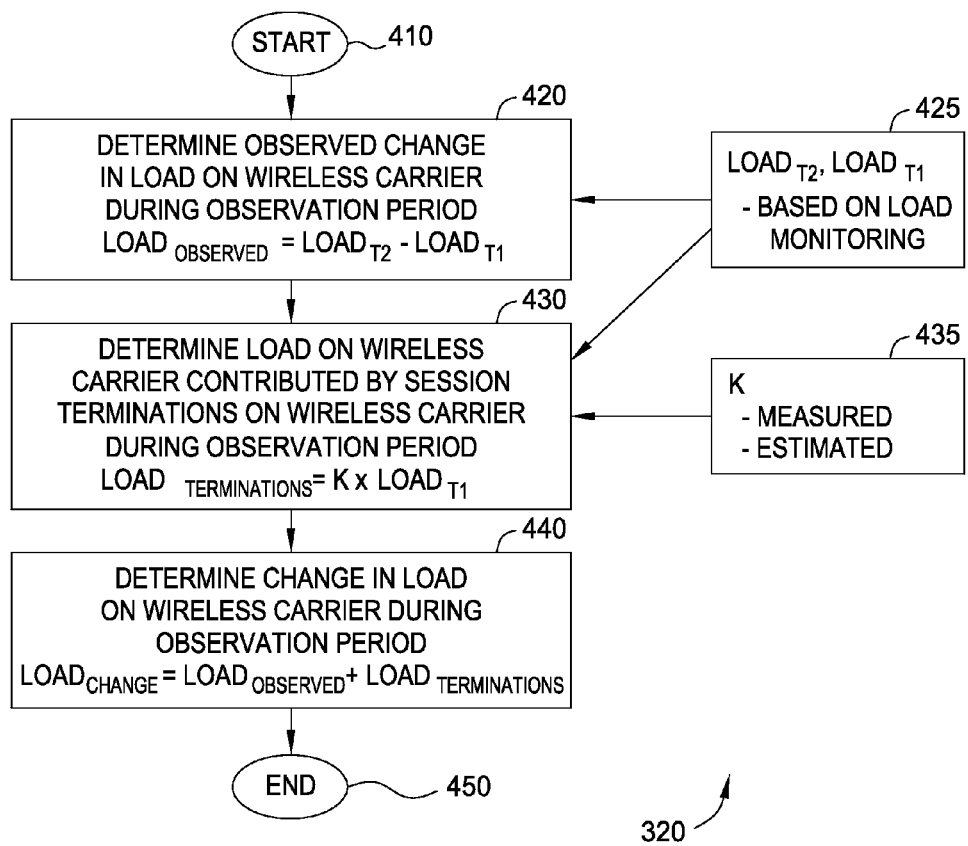
FIG. 4 depicts one embodiment of a method for determining a change in load on a wireless carrier during an observation period.

The IMLBs 150 may be configured to perform idle mode load balancing for a set of wireless carriers 132 based on the relative numbers of idle mode UEs 140 of the wireless carriers 132 as depicted and described with respect to FIGS. 2-4.

The IMLBs 150 may be configured to perform various other functions in support of and/or in conjunction with idle mode load balancing.

Although primarily depicted and described herein with respect to specific numbers and arrangements of core network 110, RNCs 120, BSs 130, wireless carriers 132, UEs 140, and IMLBs 150, it is noted that any other suitable numbers and/or arrangements of core network 110, RNCs 120, BSs 130, wireless carriers 132, UEs 140, and/or IMLBs 150 may be used.

FIG. 2 depicts one embodiment of a method for performing idle mode load balancing for a set of wireless carriers. Although primarily depicted and described as being performed serially, at least a portion of the stops of method 200 may be performed contemporaneously and/or in a different order than presented in FIG. 2.

At step 210, method 200 begins.

At step 220, numbers of idle mode UEs associated with the wireless carriers of a set of wireless carriers are determined. The number of idle mode UEs associated with a given wireless carrier may be determined based on a change in load on the wireless carrier during the observation period. The number of idle mode UEs associated with a given wireless carrier may be determined as depicted and described with respect to FIGS. 3 and 4.

At step 230, relative numbers of idle mode UEs associated with the wireless carriers in the set of wireless carriers are determined based on the numbers of idle mode UEs associated with the wireless carriers in the set of wireless carriers.

The relative numbers of idle mode UEs may be determined, based on the numbers of idle mode UEs associated with the wireless carriers, in any suitable manner. In one embodiment, for example, the relative numbers of idle mode UEs may be determined by selecting, from the numbers of idle mode UEs associated with individual wireless carriers of the set of wireless carriers, the lowest number of idle mode UEs and using this lowest number of idle mode UEs as a reference for determining the relative numbers of idle mode UEs (e.g., via comparison of the lowest number of idle mode UEs for any wireless carrier to each of the other numbers of idle mode UEs for the other wireless carriers). Similarly, in one embodiment, for example, the relative numbers of idle mode UEs may be determined by selecting, from the numbers of idle mode UEs associated with individual wireless carriers of the set of wireless carriers, the highest number of associated idle mode UEs and using this highest number of idle mode UEs associated with a wireless carrier as a reference for determining the relative numbers of idle mode UEs (e.g., via comparison of the highest number of idle mode UEs to each of the other numbers of idle mode UEs for the other wireless carriers of the set of wireless carriers).

The relative numbers of idle mode UEs associated with the wireless carriers in the set of wireless carriers may be represented using any suitable information (e.g., values indicative of the numbers of idle mode UEs estimated for each of the wireless carriers, values indicative of ratios of numbers of idle mode UEs estimated for each of the wireless carriers, or the like).

The determination of the relative numbers of idle mode UEs associated with the wireless carriers in the set of wireless carriers may be better understood by way of reference to an example. For example, consider a case in which idle mode load balancing is being performed for a set of wireless carriers that includes three wireless carriers. In this example, assume that a determination is made that the first wireless carrier is estimated to have ten idle mode wireless devices, the second wireless carrier is estimated to have twelve idle mode wireless devices, and the third wireless carrier is estimated to have fifteen idle mode wireless devices. In this example, the information indicative of the relative numbers of idle mode UEs associated with the wireless carriers indicated that the second wireless carrier has 20% more idle mode UEs as compared to the first wireless carrier and that the third wireless carrier has 50% more idle mode UEs as compared to the first wireless carrier.

At step 240, a determination is made, based on the relative numbers of idle mode UEs associated with the wireless carriers in the set of wireless carriers, as to whether or not to perform load balancing for the wireless carriers in the set of wireless carriers. If load balancing is not to be performed, method 200 proceeds to step 260, where method 200 ends. If load balancing is to be performed, method 200 proceeds to step 250.

At step 250, load balancing is performed for the wireless carriers in the set of wireless carriers based on the relative number of idle mode UEs associated with the wireless carriers in the set of wireless carriers. The idle mode load balancing, for balancing the idle mode UEs across the wireless carriers in the set of wireless carriers based on the relative numbers of idle mode UEs on the wireless carriers, may be performed in any suitable manner. For example, idle mode load balancing for balancing the idle mode UEs across the wireless carriers in the set of wireless carriers may be performed via modification of one or more cell reselection parameters, via modification of bias levels, to cause redistribution of UEs (including idle mode UEs) across the wireless carriers in the set of wireless carriers. From step 250, method 200 proceeds to step 260 where method 200 ends.

At step 260, method 200 ends.

Although primarily depicted and described as ending (for purposes of clarity), it will be appreciated that method 200 may be repeated as often as necessary and/or desirable (e.g., periodically, in response to one or more conditions, or the like, as well as various combinations thereof).

FIG. 3 depicts one embodiment of a method for determining a number of idle mode UEs associated with a wireless carrier. It is noted that method 220 of FIG. 3 may be performed for each of the wireless carriers considered during method 200 of FIG. 2. Although primarily depicted and described as being performed serially, it is noted that the steps of method 220 may be performed contemporaneously and/or different order than presented in FIG. 3.

At step 310, method 220 begins.

At step 320, a change in load on a wireless carrier during an observation period is determined. The change in load on the wireless carrier may be a change in load on the wireless carrier that accounts for both session originations on the wireless carrier during the observation period and, when applicable, session terminations on the wireless carrier during the observation period. The observation period may be any suitable length of time (e.g., one minute, two minutes, ten minutes, or any other suitable length of time). The change in load on the wireless carrier during an observation period may be determined as depicted and described with respect to FIG. 4.

At step 330, the number of idle mode UEs associated with the wireless carrier is determined based on the change in load on the wireless carrier during the observation period. The number of idle mode UEs associated with the wireless carrier may be determined based on the change in load on the wireless carrier during the observation period in any suitable manner (e.g., as a proportionality value based on the value of the change in load on the wireless carrier during the observation period, based on historical information indicative of the relationship between rate of change of load on a wireless terminal and the number of idle mode UEs on the wireless carrier, or the like).

At step 340, method 220 ends.

FIG. 4 depicts one embodiment of a method for determining a change in load on a wireless carrier during an observation period. It is noted that method 320 of FIG. 4 may be performed for each of the wireless carriers considered during method 200 of FIG. 2. Although primarily depicted and described herein as being performed serially, it is noted that the steps of method 320 may be performed contemporaneously and/or in a different order than presented in FIG. 4.

At step 410, method 320 begins.

At step 420, an observed change in load on a wireless carrier during the observation period is determined. The observed change in load on the wireless carrier during the observation period is determined as a difference between the observed load at the end of the observation period ($LOAD_{T2}$) and the load at the beginning of the observation period ($LOAD_{T1}$). As depicted in box 425, the values of the load at different times may be determined based on monitoring of the load on the wireless carrier. The monitoring of the load on the wireless carrier may be performed in any suitable manner (e.g., via monitoring of standards-based load information exchanged via RIM messaging and/or using any other suitable techniques).

At step 430, a load contributed by session terminations on the wireless carrier during the observation period is determined. The load contributed by session terminations may be determined as K multiplied by [observed load at beginning of observation period ($LOAD_{T1}$)], where K is an adjustment value. As depicted in box 435, the value of K may be determined in a number of ways (e.g., measured, estimated, or the like).

In one embodiment, the value of K may be measured by determining the number of session terminations on the wireless carrier during the observation period, determining the total number of active sessions on the wireless carrier at the beginning of the observation period, and dividing the number of session terminations on the wireless carrier during the observation period by the total number of active sessions on the wireless carrier at the beginning of the observation period.

In one embodiment, the value of K may be estimated based on historical information. In at least some cases, it is reasonable to assume that, for a given geographic region, the fraction of session terminations on the wireless carrier, as a percentage of the overall load on the wireless carrier, is substantially constant across most (if not all) carriers. In one embodiment, the value of K may be determined by (a) determining, based on historical statistics of session terminations, an estimated number of session terminations expected during the observation period, (b) determining the total number of active sessions on the wireless carrier at the beginning of the observation period, and (c) dividing the estimated number of session terminations expected during the observation period by the total number of active sessions on the wireless carrier at the beginning of the observation period. In one embodiment, the value of K for the observation period may be determined based on historical values of K.

At step 440, the change in load on the wireless carrier during the observation period is determined. The change in load on the wireless carrier during the observation period may be determined as a sum of the observed change in load (from step 420) and the load contributed by session terminations (from step 430). It is noted that, since the change in load on the wireless carrier is determined for an observation period, the change in load during the observation period also may be considered to be a rate of change of load on the wireless carrier.

At step 450, method 320 ends.

Figure 5:
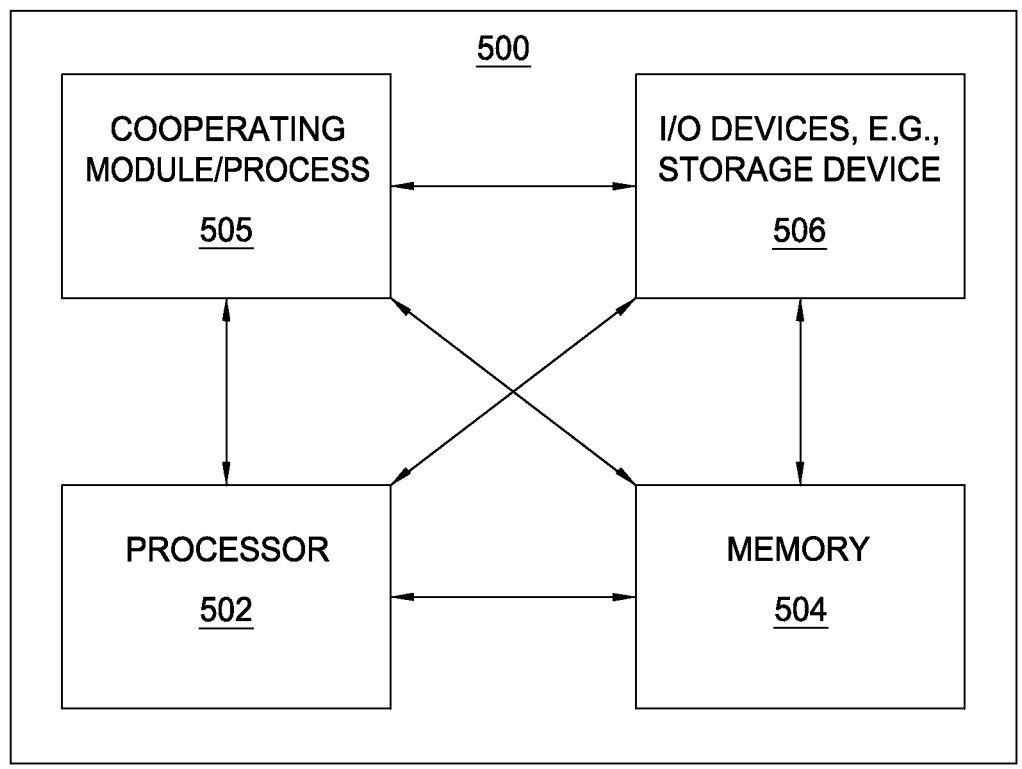
FIG. 5 depicts a high-level block diagram of a computer suitable for use in performing functions described herein.

FIG. 5 depicts a high-level block diagram of a computer suitable for use in performing functions described herein.

The computer 500 includes a processor 502 (e.g., a central processing unit (CPU) and/or other suitable processor(s)) and a memory 504 (e.g., random access memory (RAM), read only memory (ROM), and the like).

The computer 500 also may include a cooperating module/process 505. The cooperating process 505 can be loaded into memory 504 and executed by the processor 502 to implement functions as discussed herein and, thus, cooperating process 505 (including associated data structures) can be stored on a computer readable storage medium, e.g., RAM memory, magnetic or optical drive or diskette, and the like.

The computer 500 also may include one or more input/output devices 506 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 500 depicted in FIG. 5 provides a general architecture and functionality suitable for implementing functional elements described herein and/or portions of functional elements described herein. For example, the computer 500 provides a general architecture and functionality suitable for implementing one or more of an element of core network 110, a portion of an element of core network 110, an RNC 120, a portion of an RNC 120, a BS 130, a portion of a BS 130, a UE 140, a portion of a UE 140, an IMLB 150, a portion of an IMLB 150, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
determine a quantity of a change in load on a wireless carrier during an observation period, wherein the quantity of the change in load on the wireless carrier is in terms of a quantity of sessions, wherein the quantity of the change in load on the wireless carrier during the observation period is indicative of a rate of change in load on the wireless carrier;
determine a quantity of idle mode wireless devices associated with the wireless carrier using the quantity of the change in load on the wireless carrier during the observation period; and
determine, based on the quantity of idle mode wireless devices associated with the wireless carrier, whether to perform idle mode load balancing for the wireless carrier.

2. The apparatus of claim 1, wherein, to determine the quantity of the change in load on the wireless carrier during the observation period, the processor is configured to:
determine a quantity of an observed change in load on the wireless carrier during the observation period;
determine a load correction associated with session terminations on the wireless carrier during the observation period; and
determine the quantity of the change in load on the wireless carrier during the observation period based on the quantity of the observed change in load on the wireless carrier during the observation period and the load correction associated with session terminations on the wireless carrier during the observation period.

3. The apparatus of claim 2, wherein, to determine the quantity of the observed change in load on the wireless carrier during the observation period, the processor is configured to:
determine a quantity of a load on the wireless carrier at a start of the observation period;
determine a quantity of a load on the wireless carrier at an end of the observation period; and
determine the quantity of the observed change in load on the wireless carrier during the observation period based on the quantity of the load on the wireless carrier at the start of the observation period and the quantity of the load on the wireless carrier at the end of the observation period.

4. The apparatus of claim 2, wherein the processor is configured to determine the load correction associated with session terminations on the wireless carrier during the observation period based on an adjustment of a quantity of a load on the wireless carrier at a start of the observation period.

5. The apparatus of claim 2, wherein the processor is configured to determine the load correction associated with session terminations on the wireless carrier during the observation period as a product of a quantity of a load on the wireless carrier at a start of the observation period and an adjustment value.

6. The apparatus of claim 5, wherein the adjustment value is measured or estimated.

7. The apparatus of claim 5, wherein the adjustment value is determined based on a quantity of session terminations during the observation period and a quantity of sessions active at the start of the observation period.

8. The apparatus of claim 7, wherein the adjustment value is determined by dividing the quantity of session terminations on the wireless carrier during the observation period by the quantity of sessions active at the start of the observation period.

9. The apparatus of claim 5, wherein the adjustment value is determined based on historical information associated with the wireless carrier.

10. The apparatus of claim 2, wherein the processor is configured to determine the quantity of the change in load on the wireless carrier during the observation period based on the quantity of the observed change in load on the wireless carrier during the observation period and the load correction associated with session terminations on the wireless carrier during the observation period by summing the quantity of the observed change in load on the wireless carrier during the observation period and the load correction associated with session terminations on the wireless carrier during the observation period.

11. The apparatus of claim 1, wherein the wireless carrier is a first wireless carrier, wherein the processor is configured to:
determine a quantity of a change in load on a second wireless carrier during the observation period; and determine a quantity of idle mode wireless devices associated with the second wireless carrier using the quantity of the change in load on the second wireless carrier during the observation period.

12. The apparatus of claim 11, wherein the processor is configured to:
determine, for the first wireless carrier and the second wireless carrier, information indicative of relative quantities of idle mode wireless devices associated with the first wireless carrier and the second wireless carrier respectively.

13. The apparatus of claim 12, wherein the processor is configured to:
determine, based on the information indicative of the relative quantities of idle mode wireless devices associated with the first wireless carrier and the second wireless carrier respectively, whether to perform idle mode load balancing for the first wireless carrier and the second wireless carrier.

14. The apparatus of claim 12, wherein the processor is configured to:
initiate idle mode load balancing for the first wireless carrier and the second wireless carrier based on the information indicative of the relative quantities of idle mode wireless devices associated with the first wireless carrier and the second wireless carrier respectively.

15. The apparatus of claim 14, wherein, to initiate idle mode load balancing for the first wireless carrier and the second wireless carrier, the processor is configured to:
initiate modification of one or more bias levels associated with at least one of the first wireless carrier or the second wireless carrier.

16. The apparatus of claim 11, wherein the first wireless carrier and the second wireless carrier are associated with one or more wireless access nodes.

17. The apparatus of claim 11, wherein the first wireless carrier and the second wireless carrier are associated with one or more wireless network controllers.

18. The apparatus of claim 11, wherein the first wireless carrier and the second wireless carrier are associated with one or more radio access technologies (RATs).

19. The apparatus of claim 1, wherein the processor is configured to determine the quantity of idle mode wireless devices associated with the wireless carrier using the quantity of the change in load on the wireless carrier during the observation period at least one of based on a proportionality value that is based on the quantity of the change in load on the wireless carrier during the observation period or based on historical information.

20. The apparatus of claim 1, wherein the quantity of the change in load on the wireless carrier is determined based on a quantity of an observed change in load on the wireless carrier due to session originations on the wireless carrier during the observation period and a quantity of a load correction associated with session terminations on the wireless carrier during the observation period, wherein, to determine the quantity of idle mode wireless devices associated with the wireless carrier using the quantity of the change in load on the wireless carrier during the observation period, the processor is configured to:
determine the quantity of idle mode wireless devices associated with the wireless carrier, using the quantity of the change in load on the wireless carrier during the observation period, based on at least one of a proportionality value or historical information.

21. A non-transitory computer-readable storage medium storing instructions which, when executed by a computer, cause the computer to perform a method, the method comprising:
determining a quantity of a change in load on a wireless carrier during an observation period, wherein the quantity of the change in load on the wireless carrier is in terms of a quantity of sessions, wherein the quantity of the change in load on the wireless carrier during the observation period is indicative of a rate of change in load on the wireless carrier;
determining a quantity of idle mode wireless devices associated with the wireless carrier using the quantity of the change in load on the wireless carrier during the observation period; and
determining, based on the quantity of idle mode wireless devices associated with the wireless carrier, whether to perform idle mode load balancing for the wireless carrier.

22. A method, comprising:
determining, by a processor, a quantity of a change in load on a wireless carrier during an observation period, wherein the quantity of the change in load on the wireless carrier is in terms of a quantity of sessions, wherein the quantity of the change in load on the wireless carrier during the observation period is indicative of a rate of change in load on the wireless carrier;
determining a quantity of idle mode wireless devices associated with the wireless carrier using the quantity of the change in load on the wireless carrier during the observation period; and
determining, based on the quantity of idle mode wireless devices associated with the wireless carrier, whether to perform idle mode load balancing for the wireless carrier.

* * * * *